United States Patent
Testu et al.

(10) Patent No.: US 8,750,665 B2
(45) Date of Patent: Jun. 10, 2014

(54) BUFFERED OPTICAL FIBER AND TELECOMMUNICATIONS CABLE

(75) Inventors: Jean Marc Testu, Antibes Juan les Pins (FR); Olivier Tatat, Sangatte (FR)

(73) Assignee: Draka Comteq B.V., Amsterdam (NL)

( * ) Notice: Subject to any disclaimer, the term of this patent is extended or adjusted under 35 U.S.C. 154(b) by 730 days.

(21) Appl. No.: 12/863,263

(22) PCT Filed: Jan. 16, 2009

(86) PCT No.: PCT/NL2009/000006
§ 371 (c)(1),
(2), (4) Date: Dec. 15, 2010

(87) PCT Pub. No.: WO2009/091243
PCT Pub. Date: Jul. 23, 2009

(65) Prior Publication Data
US 2011/0103754 A1   May 5, 2011

(30) Foreign Application Priority Data

Jan. 18, 2008 (FR) ...................... 08 00269

(51) Int. Cl.
*G02B 6/02* (2006.01)
*G02B 6/44* (2006.01)

(52) U.S. Cl.
CPC ............ *G02B 6/4495* (2013.01); *G02B 6/4401* (2013.01)
USPC .......................................... 385/128; 385/102

(58) Field of Classification Search
USPC ........................................................ 385/128
See application file for complete search history.

(56) References Cited

U.S. PATENT DOCUMENTS

| | | | | |
|---|---|---|---|---|
| 4,072,400 A | * | 2/1978 | Claypoole et al. | 385/128 |
| 5,011,260 A | * | 4/1991 | Marx et al. | 385/100 |
| 5,155,788 A | * | 10/1992 | Chapin et al. | 385/104 |
| 5,181,268 A | * | 1/1993 | Chien | 385/128 |
| 5,408,564 A | | 4/1995 | Mills | |
| 6,067,394 A | * | 5/2000 | Ruello et al. | 385/106 |
| 6,714,713 B2 | * | 3/2004 | Lanier et al. | 385/128 |
| 6,775,443 B2 | * | 8/2004 | Bringuier et al. | 385/102 |
| 6,931,190 B2 | * | 8/2005 | Ino et al. | 385/128 |
| 7,570,853 B2 | * | 8/2009 | Mahapatra et al. | 385/102 |
| 2007/0031096 A1 | * | 2/2007 | Moorjani et al. | 385/128 |

FOREIGN PATENT DOCUMENTS

| | | |
|---|---|---|
| EP | 0527266 A1 | 2/1993 |
| EP | 0838703 A2 | 4/1998 |
| GB | 2296575 A * | 7/1996 |
| WO | WO2009091243 A1 | 7/2009 |

* cited by examiner

*Primary Examiner* — Hemang Sanghavi
(74) *Attorney, Agent, or Firm* — Shumaker, Loop & Kendrick, LLP

(57) ABSTRACT

A buffered optical fiber (10) comprises a central core (11) surrounded by an optical cladding (12), a coating (13) surrounding the optical cladding, a protective buffer (15) surrounding the coating and an intermediate layer (14) between the coating and the protective buffer. The intermediate layer consists of hot melt seal and peel material. The intermediate layer (14) may be extruded in tandem with the outer protective buffer (15).

14 Claims, 1 Drawing Sheet

BUFFERED OPTICAL FIBER AND TELECOMMUNICATIONS CABLE

TECHNICAL FIELD AND BACKGROUND OF THE INVENTION

The present invention relates to the field of optical fiber telecommunications cables and more particularly to so-called buffered fiber cables in which each optical fiber is buffered.

Cables with buffered fibers are known as "buffered optical fiber cables" and have notably been described in documents U.S. Pat. No. 3,980,390 and U.S. Pat. No. 4,629,286.

In a way known per se, an optical fiber has a central core, with the function of transmitting and possibly amplifying an optical signal, and an optical cladding, with the function of confining the optical signal in the core. The fiber also has a protective coating consisting of a photo-cross-linkable polymer material which provides a mechanical protection and seal to the optical fiber. The optical fiber, with its coating, has standardized dimensions in order to allow optical coupling with other fibers and/or connectors of optical modules. Typically, a single-mode fiber has a standardized diameter of 125 μm for the optical guide and 250 μm with the coating. A buffered optical fiber in addition to the coating has a protective buffer surrounding the coated fiber. This protective buffer is external to the coating of the fiber and is not comparable with the optical cladding of the fiber which surrounds the central core. The outer protective buffer may consist of a thermoplastic material and enable to increase the outer diameter of the fiber to a standardized value of 900 μm.

Buffered fiber cables may be used for indoor telecommunications networks. Individual access to each fiber should be possible, rapidly and easily for a distribution in a given building. For this purpose, operators make a diversion in the telecommunications cable; an opening is made in the cable and one or more fibers are picked up in order to feed a given optical system with a signal. By the increased diameter of 900 μm of the buffered fiber, handling of the thereby diverted fiber may be easier and it may be directly connected with certain optical modules.

There exist cables with tightly buffered fibers, known as "tight buffered fibers", in which the protective buffer strongly adheres to the coating of the fiber. Such a structure is robust and remains stable over the whole temperature range of use of the cable, i.e. typically from −40° C. to +70° C. However with such a structure it is not possible to access the 250 μm fiber over more than a few centimeters. In fact, when the buffer is removed, because of the strong adherence with the coating, the coating of the fiber is also torn off leaving the optical guide exposed. This may represent a drawback when it is intended to coil up unbuffered fibers in a casing for example.

There also exist cables with semi-tightly buffered fibers, known as "semi-tight buffered fibers", in which the protective buffer is decoupled from the coating of the fiber by an interstice of air or filling gel for example. With such a structure, it is possible to remove the protective buffer without damaging the coating of the fiber but this structure is not stable over the temperature range of use of the cable. Indeed, the thermoplastic material of the protective buffer is subject to deformations due to changes in temperature, which introduces an axial stress on the buffered fiber and causes an increase in attenuation. The contraction of the protective buffer under the effect of a drop in temperature may thus introduce a "piston effect" at the end of the diverted fiber which makes any operation delicate for connecting it to an optical module.

The decoupling of the protective buffer and of the coating of the fiber also poses a problem during diversion operations. To divert a buffered fiber, the operator pulls the fiber through a diversion window; this tension force is applied on the protective buffer which may lengthen elastically and cause a shift between the length of the diverted optical fiber relatively to the length of the drawn protective buffer. Such a shift also causes attenuation in the optical signal transmitted by the fiber.

Therefore, it was sought to make buffered optical fibers with a protective buffer which is sufficiently coupled to the coating of the fiber in order to avoid any shift, but which may be easily removed without damaging the coating so as to allow access to the 250 μm fiber over at least one meter.

Document U.S. Pat. No. 5,181,268 describes a buffered optical fiber comprising an intermediate layer between the coating of the 250 μm fiber and the 900 μm protective buffer. With the intermediate layer, friction may be reduced between the protective buffer and the coating in order to facilitate removal of the protective buffer without damaging the coating. This document proposes an intermediate layer consisting of a solid lubricant and a binder. The lubricant may be TEFLON and the binder may be an acrylic polymer.

The intermediate layer proposed in document U.S. Pat. No. 5,181,268 cannot be extruded in tandem with the protective buffer but requires a specific application. It is notably necessary to have the fiber coated with the intermediate layer passed into a drying oven before adding the outer protective buffer. The intermediate layer of document U.S. Pat. No. 5,181,268 complicates the cable manufacturing method and increases its price. In addition, TEFLON contains fluorine (polytetrafluorethylene) and is therefore not a halogen-free material. Now, certain legislations, and notably European legislation, impose the sole use of halogen-free materials for indoor installations. The cable of document U.S. Pat. No. 5,181,268 would therefore not be suitable for cabling a building, in compliance with these regulations.

Document EP-A-0 690 033 also describes a buffered optical fiber comprising an intermediate layer between the coating of the 250 μm fiber and the 900 μm protective buffer. This document points out that the intermediate layer of U.S. Pat. No. 5,181,268 does not sufficiently adhere to the coating of the fiber, does not allow line manufacturing at high speed and is not sufficiently uniform. In order to solve these identified problems, document EP-A-0 690 033 proposes a cross-linked intermediate layer comprising ultra high density polyethylene (UHMWPE) or TEFLON mixed with a photo-cross-linkable binder such as urethane polymer.

Document U.S. Pat. No. 6,775,443 also describes a buffered optical fiber comprising an intermediate layer between the coating of the 250 μm fiber and the 900 μm protective buffer. This document proposes a cross-linked intermediate layer comprising an urethane acrylate matrix comprising oligomers, monomers, a photoinitiator and an anti-oxidant in combination with a liquid reactive release substance, such as liquid silicone.

The intermediate layers proposed in documents EP-A-0 690 033 and U.S. Pat. No. 6,775,443 should be cross-linked; their passing under UV lamps should therefore be foreseen and application of the intermediate layer cannot be easily tandemized with the extrusion of the outer protective buffer. Further, photo-cross-linkable materials are relatively expensive.

There is therefore a need for a buffered optical fiber comprising an intermediate layer which may be applied without slowing down the fiber manufacturing method and having limited cost. The intermediate layer should guarantee proper coupling between the coating of the fiber and the outer protective buffer in order to avoid any shift of the buffer relatively to the fiber, without providing mechanical stresses on the fiber and should allow the protective buffer to be removed rapidly and easily without damaging the coating of the fiber.

SUMMARY OF THE INVENTION

For this purpose, the invention proposes the use of a hot melt seal and peel material for making the intermediate layer. Such a material does not require any drying or cross-linking and may be applied at the same time as the outer buffer.

The invention more particularly proposes a buffered optical fiber comprising:
  a central core surrounded by an optical cladding;
  a coating surrounding the optical cladding;
  a protective buffer surrounding the coating;
  an intermediate layer between the coating and the protective buffer, said intermediate layer consisting of a hot melt seal and peel material.

According to the embodiments, the fiber according to the invention may further comprise one or more of the following features:
  the material of the intermediate layer has a softening temperature above +70° C.;
  the material of the intermediate layer has a glass transition temperature less than −40° C.;
  the intermediate layer is translucent; the intermediate layer has a thickness comprised between 15 µm and 35 µm;
  the material of the intermediate layer is a thermoplastic with the consistency of a flexible gel over a temperature range comprised between −40° C. and +70° C.; the material of the intermediate layer comprises synthetic hydrocarbon polymers;
  the material of the protective buffer is selected from polybutylene terephthalate (PBT), nucleated polybutylene terephthalate, low shrink polybutylene terephthalate, polyamide 12 (PA12), amorphous polyamide 12, polyamide 11, polyvinyl chloride (PVC), nylon, polyethylene (PE), halogen-free flame retarding materials (HFFR), urethane polymer, polyester or a blend thereof.

The invention also relates to a telecommunications cable comprising a plurality of buffered optical fibers according to the present invention.

The invention further relates to a method for manufacturing a buffered optical fiber comprising the steps of:
  providing a coated optical fiber;
  co-extruding over the coated fiber an intermediate layer and an outer protective buffer;
  said intermediate layer consisting of a hot melt seal and peel material.

In one embodiment the step of providing a coated optical fiber is preferably carried out by drawing a fiber optic preform in order to form a central core and an optical cladding and applying a coating surrounding the optical cladding.

According to one embodiment, the step of extruding the intermediate layer was carried out in tandem with the extrusion of the protective buffer. This extrusion step may be carried at a temperature comprised between 130° C. and 160° C.

DESCRIPTION OF THE FIGURES

Other features and advantages of the invention will become apparent upon reading the description which follows, of embodiments of the invention, given as an example and with reference to the appended drawings wherein.

DETAILED DESCRIPTION OF THE INVENTION

Figure 1:
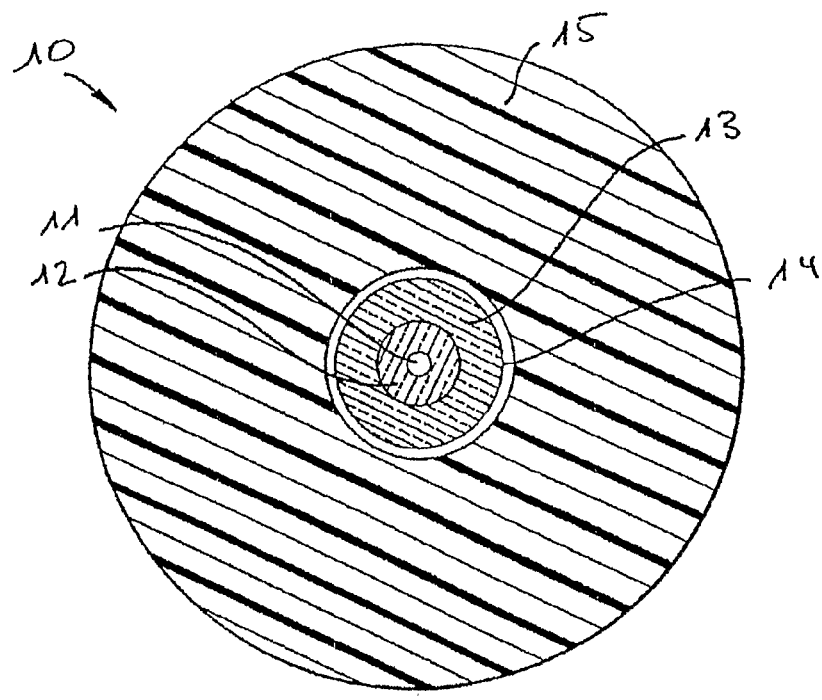
FIG. 1 is a transverse sectional view of a buffered optical fiber according to the invention.

FIG. 1 shows a buffered optical fiber according to the invention. The buffered optical fiber 10 comprises a central core 11 surrounded by an optical cladding 12 and a coating 13. The central core 10 of the single-mode optical fiber has a standardized diameter from 8 to 9 µm and the optical fiber with its coating 13 has a standardized outer diameter of 250 µm. FIG. 1 is schematic and is not to scale. The fiber according to the invention is buffered, i.e. it additionally has a protective buffer 15 surrounding the coating 13. In an embodiment the outer diameter of the fiber is increased to a standardized value of 900 µm.

The coating 13 of the fiber typically comprises one or more layers of photo-cross-linked acrylate resins. The coating 13 may be colored in order to facilitate localization of the fibers in the cable.

The protective buffer 15, known as the "buffer", typically consists of thermoplastic material or urethane acrylate. It is notably known how to make the protective buffer 15 with a material selected from polybutylene terephthalate (PBT), nucleate polybutylene terephthalate, low shrink polybutylene terephthalate, polyamide 12 (PA12), amorphous polyamide 12, polyamide 11, polyvinyl chloride (PVC), nylon, polyethylene (PE), halogen-free flame retarding materials (HFRR), urethane polymer, polyester or a blend thereof.

The fiber according to the invention further comprises an intermediate layer 14 located between the coating 13 of the optical fiber and the outer protective buffer 15. According to the invention, this intermediate layer 14 consists of hot melt seal and peel material. By hot melt material, is understood a thermoplastic material which becomes fluid under the effect of heat; such a material is generally designated by the expression "hot melt". By seal and peel material, is understood a temporary protective material which may be removed without leaving any traces; such a material is generally designated by the expression "seal and peel". When the seal and peel material is removed, the coating of the optical fiber remains substantially intact, i.e. is not damaged.

The intermediate layer 14 may be formed of a thermoplastic gel, such as for example a thermoplastic gel formulated from synthetic hydrocarbon polymers. Such a material is notably marketed by Henkel® under reference Macroplast CF 405. Such a material has the consistency of a flexible gel over the whole operating temperature range of the cable, i.e. typically from −40° C. to +70° C. The flexibility of the material of the intermediate layer allows the mechanical stresses on the fiber to be limited while guaranteeing proper coupling between the coating of the fiber and the outer protective buffer.

The use of a thermoplastic material as defined above allows the intermediate layer and the outer protective buffer 15 to be extruded in the same manufacturing step, for example at the same time. Introduction of the intermediate layer 14 into the buffered fiber therefore only requires a melting device and an injector and does not require any additional manufacturing step. The cost of the hot melt seal and peel material is furthermore less than that of a cross-linkable material. The manufacturing cost of the buffered fiber according to the invention is therefore reduced relatively to the solutions described in the prior art.

The material of the intermediate layer 14 has a softening temperature above +70° C., i.e. above the maximum of the temperature range of use of the buffered fiber. The material of the intermediate layer 14 further has a glass transition temperature less than −40° C., i.e. less than the minimum of the temperature range of use of the buffered fiber. The material of the intermediate layer 14 therefore remains stable over the whole range of temperatures for using optical fibers according to the invention. As an example, the softening temperature of macroplast CF 405 is about +97° C. and the glass transition temperature of macroplast CF 405 is −80° C.

The intermediate layer 14 of the fiber according to the invention is an interface between the coating 13 of the fiber and the outer protective buffer 15. The thickness of the intermediate layer 14 may be comprised between 15 µm and 35 µm. The thickness of the intermediate layer should not be too large so as not to reduce too much the thickness of the outer protective buffer 15 which has a standardized outer diameter. A too large reduction in the thickness of the outer protective buffer would have detrimental effects with loss of mechanical strength of the buffered fiber. The thickness of the intermediate layer 14 should however be sufficient in order to provide the expected coupling between the outer protective buffer and the optical fiber.

The material selected for this intermediate layer 14 has flexible consistency so as to provide proper coupling between the protective buffer 15 and the optical fiber without inducing any stresses on the fiber. For example, the hardness of the Macroplast CF 405 gel was evaluated by a so-called measurement of cone penetrability. The equipment used for the measurement is the one described in the French Standard NFT60-119. For an application time of 5 seconds, the measured penetrabilities were 70 tenths of a mm at 20° C., 35 tenths of a mm at −40° C. and 140 tenths of a mm at 70° C. Thus, over the operating temperature range of an optical fiber cable (−40/+70° C.), the gel of the intermediate layer kept flexible consistency so that it does not cause any stresses on the fiber, notably at low temperatures.

The material selected for this intermediate layer 14 may also ensure proper detachment of the protective buffer 15 without damaging the coating 13 of the fiber. The applicant carried out tests with an intermediate layer 14 of a thickness of 25 µm consisting of Macroplast CF 405 from Henkel® and an outer PA12 protective buffer. Portions of protective buffer of a length of 100 mm long were exposed, showing the coating of the actual fiber and without any damages. In less than one minute, more than one meter of fiber was thereby unbuffered without damaging the 250 µm optical fiber.

The material of the intermediate layer 14 is further compatible with any material capable of being used in order to form the outer protective buffer 15. Polyamide 12 (PA12) may advantageously be used for forming the protective buffer 15 in combination with Macroplast CF 405 for the intermediate layer 14 as both of these materials are translucent and the color of the coating 13 of the fiber is then visible through the protective buffer 15; it is unnecessary to color the protective buffer 15 for assisting with identification of the fibers in the cable.

Figure 2:
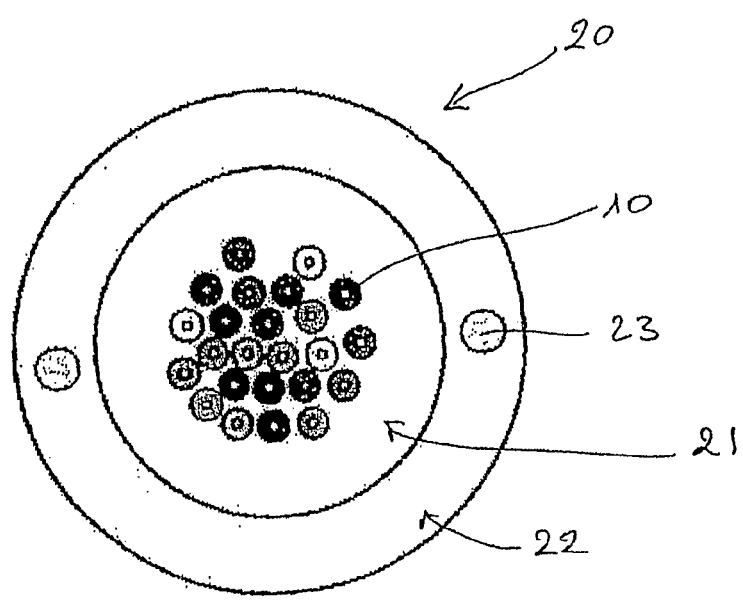
FIG. 2 is a cable of buffered optical fibers.

FIG. 2 shows a transverse section of a telecommunications cable 20 comprising buffered optical fibers 10. In a known way per se, a telecommunications cable has a central core 21 receiving optical fibers. The optical fibers may be free or grouped in modules or micromodules, and they may either be buffered or not. In FIG. 2, the optical fibers 10 are buffered and free with an intermediate layer located between the coating of the fiber and the outer protective buffer, this intermediate layer consisting of a hot melt seal and peel material.

The cable of FIG. 2 also comprises a buffer 22 surrounding the central core 21. The buffer 22 of the cable 20 may be of a polymer material, generally in a halogen-free flame retarding material (HFFR). The buffer 22 of the cable 20 contains reinforcement components 23 for limiting the deformations of the cable due to traction forces, for example during the laying of the cable in a conduit, and limiting the axial deformations of the cable in contraction and expansion when the latter is subject to large changes in temperature by compensating the compression or expansion forces induced by the buffer 22.

The telecommunications cable according to the invention is particularly well suited for distribution of an optical telecommunications network in a building for example. Diversion of fibers towards an optical system from the cable of FIG. 2 is performed in the following way: two cut-outs are made in the buffer 22 of the cable in order to create a first opening through which a fiber 10 is cut, and a second opening through which the cut fiber 10 is pulled out in order to be diverted. Diversion of the fibers is preferably carried out over about 20 meters. The filling level of the cable should therefore not be too large.

With the intermediate layer 14 of the buffered fiber 10 according to the invention, it is possible to avoid any shift of the fiber relatively to the outer protective buffer 15 over which the traction force is mainly exerted. When the fiber is diverted, the intention is to be able to access the 250 µm fiber. For this, the fiber 10 is unbuffered, i.e. the outer protective buffer 15 is torn off. By means of the intermediate layer 14, this tearing-off operation of the protective buffer 15 may be performed over a length of more than one meter without any damage to the fiber. The 250 µm fiber may then be stored in an optical casing with less space required than that of a 900 µm buffered fiber.

Moreover, the fiber according to the invention is made by using available equipment and without adding an additional step. In a known way per se, an optical fiber is made by fiber drawing from a fiber optic preform which determines the central core and the optical cladding of the fiber. A coating, generally a colored photo-cross-linkable resin is applied in line with the fiber drawing. A protective buffer 15 may be extruded around the fiber either directly after drawing of the optical fiber, i.e. inline. In another embodiment a buffer 15 may be extruded on a fiber that is unwound from a drum, i.e. offline. According to the invention, an intermediate layer 14 in hot melt seal and peel material is extruded in tandem with the protective buffer 15. The operation for extruding the intermediate layer may be performed at a temperature comprised between 130° C. and 160° C., preferably about 140° C. No additional cross-linking or drying step is necessary. The manufacturing cost of the fiber according to the invention is thereby limited.

Of course, the present invention is not limited to the embodiments described as an example; in particular, the invention is not limited to the values of the indicated diameters. New standards not adopted to this day may impose other fiber diameter values or protective buffer diameter values without excluding that the invention may be applied and the invention may be applied to an optical fiber which does not meet the criteria of the standards. Also, the materials cited for the coating and the outer protective buffer may be different from those mentioned as example in the description above.

The invention claimed is:

1. A buffered optical fiber comprising:
a central core surrounded by an optical cladding;
a coating surrounding the optical cladding;
a protective buffer surrounding the coating; and
an intermediate layer between the coating and the protective buffer, the intermediate layer consisting of a hot melt seal and peel material that is a thermoplastic material that becomes fluid when heated, wherein:

the intermediate layer couples the coating to the protective buffer to prevent shifting between the coating and protective buffer;

the intermediate layer is completely releasable from the coating without leaving traces on the coating or damaging the coating;

the material of the intermediate layer has a softening temperature above +70° C.; and the material of the intermediate layer has a glass transition temperature less than −40° C.

2. The optical fiber of claim 1, wherein the material of the intermediate layer has a softening temperature above +97° C.

3. The optical fiber of claim 1, wherein the material of the intermediate layer has a glass transition temperature less than −80° C.

4. The optical fiber of claim 1, wherein the intermediate layer is translucent.

5. The optical fiber of claim 1, wherein the intermediate layer has a thickness comprised between 15 μM and 35 μm 6. The optical fiber of claim 1, wherein the material of the intermediate layer is a thermoplastic with the consistency of a flexible gel over a temperature range comprised between −40° C. and +70° C.

7. The optical fiber of claim 6, wherein the material of the intermediate layer comprises synthetic hydrocarbon polymers.

8. The optical fiber of claim 1, wherein the material of the protective buffer is selected from polybutylene terephthalate (PBT), nucleated polybutylene terephthalate, low shrink polybutylene terephthalate, polyamide 12 (PA12), amorphous polyamide 12, polyamide 11, polyvinyl chloride (PVC), nylon, polyethylene (PE), halogen-free flame retarding materials (HFRR), urethane polymer, polyester or a blend thereof.

9. The optical fiber of claim 1, wherein the hot melt seal and peel material is a non cross-linked halogen-free material.

10. A telecommunications cable comprising a plurality of buffered optical fibers according to claim 1.

11. A method for manufacturing a buffered optical fiber comprising the steps of:

providing a coated optical fiber;

co-extruding over the coated fiber an intermediate layer and an outer protective buffer;

the intermediate layer consisting of a hot melt seal and peel material that is a thermoplastic material that becomes fluid when heated, wherein:

the intermediate layer couples the coating to the protective buffer to prevent shifting between the coating and protective buffer;

the intermediate layer is completely releasable from the coating without leaving traces on the coating or damaging the coating; and the material of the intermediate layer has a softening temperature above +70° C.; and the material of the intermediate layer has a glass transition temperature less than −40° C.

12. The method of claim 11, wherein the extrusion step of the intermediate layer is performed in tandem with the extrusion of the buffer.

13. The method of claim 11, wherein the step for extruding the intermediate layer is performed at a temperature comprised between 130° C. and 160° C.

14. The method of claim 11, wherein the hot melt seal and peel material is a non cross linked halogen-free material.

* * * * *